May 4, 1965  W. R. MILLER ETAL  3,181,424
COUNTERBALANCING MECHANISM
Filed Feb. 14, 1962  3 Sheets-Sheet 1
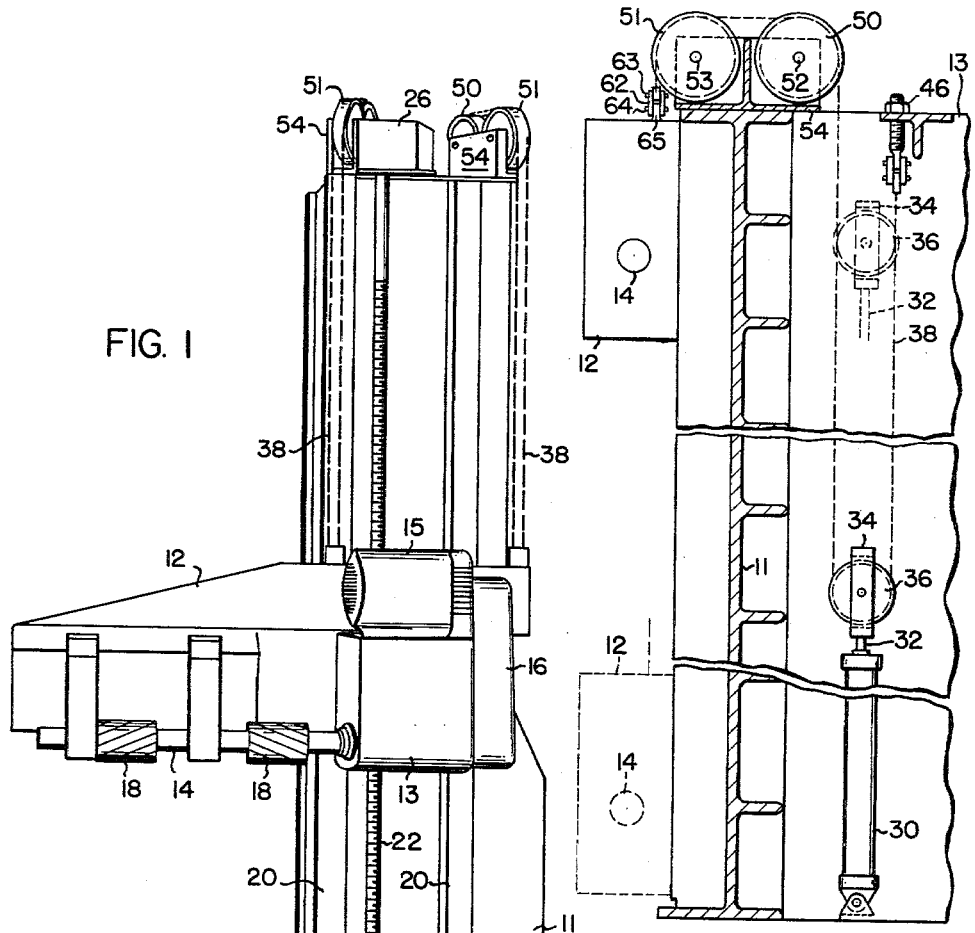
FIG. 1
FIG. 4
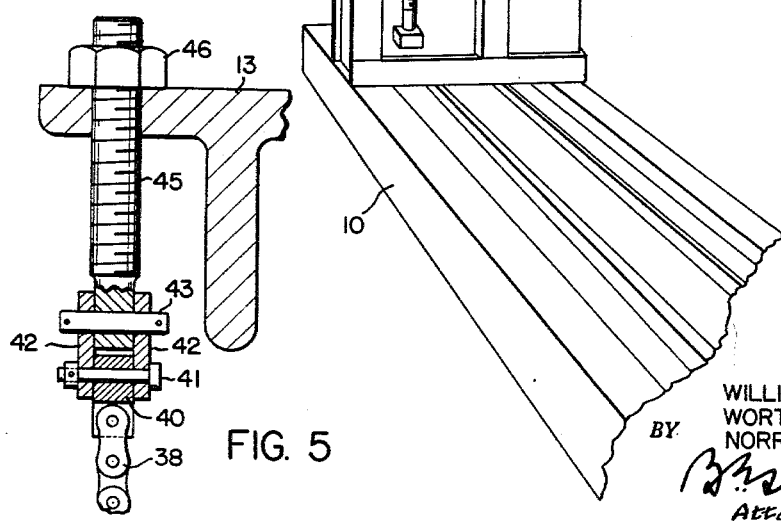
FIG. 5
*INVENTORS*
WILLIAM R. MILLER
WORTHY J. FORWARD
NORRIS E. BLECK
BY
*Attorney*

May 4, 1965 W. R. MILLER ETAL 3,181,424
COUNTERBALANCING MECHANISM
Filed Feb. 14, 1962 3 Sheets-Sheet 2

INVENTORS
WILLIAM R. MILLER
WORTHY J. FORWARD
NORRIS E. BLECK
BY
Attorney

May 4, 1965   W. R. MILLER ETAL   3,181,424
COUNTERBALANCING MECHANISM
Filed Feb. 14, 1962   3 Sheets-Sheet 3

INVENTORS
WILLIAM R. MILLER
WORTHY J. FORWARD
NORRIS E. BLECK
BY
Attorney

United States Patent Office 3,181,424
Patented May 4, 1965

3,181,424
COUNTERBALANCING MECHANISM
William R. Miller, Rochester, Worthy J. Forward, Irondequoit, and Norris E. Bleck, Rochester, N.Y., assignors to Farrel-Birmingham Company, Inc., Rochester, N.Y., a corporation of Connecticut
Filed Feb. 14, 1962, Ser. No. 173,285
7 Claims. (Cl. 90—15)

The present invention relates to machine tools, and more particularly to means for counterweighting or counterbalancing vertically slidable parts of such machines, such as the tool head slide of a milling machine, a horizontal boring machine, a radial drilling machine, or the like.

Heretofore, weights have been used as a counterbalancing means. For large machinery, however, the weights get cumbersome and increase the area required for the column on which the tool head slides. Moreover, on a machine for universal work, such as a machine for boring, milling, and drilling, it is inconvenient and difficult to change weights with change in the tool head in order to secure a proper counterbalance between the weights and the tool head.

One object of the present invention is to provide means for counterbalancing a part, such as the vertically adjustable slide for the tool head of a machine tool, which will be more compact, and more flexible than counterbalancing means heretofore provided.

Another object of the invention is to provide a counterbalancing means of the type described which can readily be applied to existing machine tools.

Another object of the invention is to provide means for more precisely counterbalancing the weight of a vertically movable part, such as the tool head carrying slide of a machine tool, than counterbalancing or counterweighting apparatus heretofore known.

Another object is to provide means for counterbalancing the weight of a machine tool head slide or the like which will permit adjusting the slide precisely so that it is level and not canted with reference to the ways on which it slides.

Other objects of the invention will be apparent hereinafter from the specification and from the recital of the appended claims, particularly when read in conjunction with the accompanying drawings in which is illustrated one embodiment of the invention.

In the drawings:

FIG. 1 is a fragmentary perspective view showing a conventional milling machine equipped with counterbalancing means constructed according to one embodiment of this invention;

FIG. 4 is a vertical sectional view taken generally on the line 4—4 of FIG. 3 looking in the direction of the arrows, both the tool slide and one of the idler sprockets being shown in full and in dotted lines at two extreme positions, respectively;

FIG. 5 is an enlarged fragmentary sectional view on an enlarged scale showing the means for adjusting the mechanism to suit the chain used.

Figure 2:
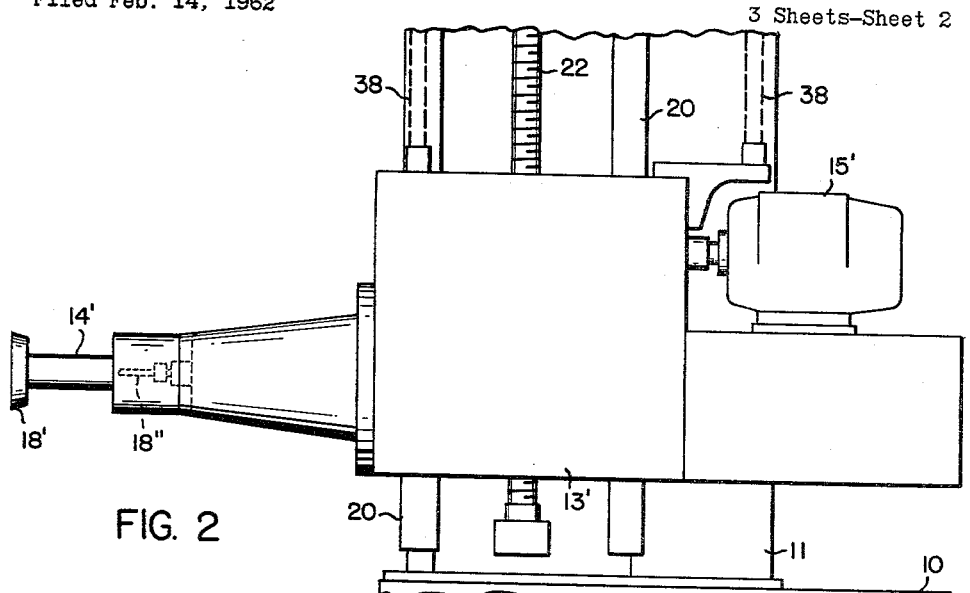
FIG. 2 is a fragmentary side elevation on an enlarged scale illustrating other forms of tool head slides with which the invention may be used.

In the embodiment of the invention illustrated in the drawings, the slide on which the tool head is mounted, is adjusted on its column to any desired vertical position by a conventional screw and nut. In its adjustment and while the slide is stationary in any adjusted position it is counterweighted or counterbalanced by two pistons that are reciprocable in cylinders fixed relative to the column. For achieving the counterbalancing action, a pair of chains is provided. Each chain is connected at one end to the column and at its other end to the slide. Between its two points of connection each chain passes under an idler, that is rotatably mounted to each piston, and over two idlers, that are rotatably mounted on top of the column.

When the slide is being adjusted downwardly, the pull of the slide on the chain pulls each piston upwardly, forcing the hydraulic fluid out of the associated cylinder. A first adjustable relief valve controls the flow of the fluid and therefore controls this movement. When the pressure has built up enough, it closes a check valve in the line which connects the pump with the cylinder in which the piston is reciprocable. Thereafter the hydraulic fluid flowing from the pump is diverted to open a second relief valve and operate a control for the motor. The motor is adjustable and preferably is of the swash plate type. The pressure of the hydraulic fluid shifts the swash plate; and when counterbalance has been achieved, the swash plate is at zero inclination, that is, the motor is idling and not pumping fluid into the system.

When the slide is being adjusted upwardly each piston can move down in its cylinder. This relieves the pressure on the check valve; and the check valve opens. Fluid can once again flow from the motor to the cylinder. Thus the swash plate changes position; and the motor resumes pumping. When the piston position corresponds to the new adjusted position of the slide, the pressure of the hydraulic fluid is exerted on the second relief valve; and again the swash plate is moved toward zero position until full counterbalance is achieved, at which point the motor again idles.

The two relief valves for each system are adjusted to open at different pressures because when the slide is descending its movement is assisted by gravity; whereas when it is ascending its movement is against gravitational resistance. The second relief valve in each system is adjusted therefore to open under less pressure than the first relief valve of the system. The two systems are provided so that they can be adjusted independently to insure against cant or binding of the slide on its ways. This insures smoother movement, less wear on the adjusting screw and nut, and that the slide will be level in any adjusted position.

Referring now to the drawings by numerals of reference, 10 denotes the bed of the machine, and 11 designates the tool column. Mounted for vertical sliding adjustment on the tool column is a slide 12, on which there is carried a tool head 13 in which there is journaled a tool spindle 14. The tool spindle is driven by a motor 15, carried by the head, through a belt and pulleys, or a gear drive, enclosed within the guard 16. In FIG. 1, the tool spindle is shown as carrying two milling cutters 18.

Figure 3:
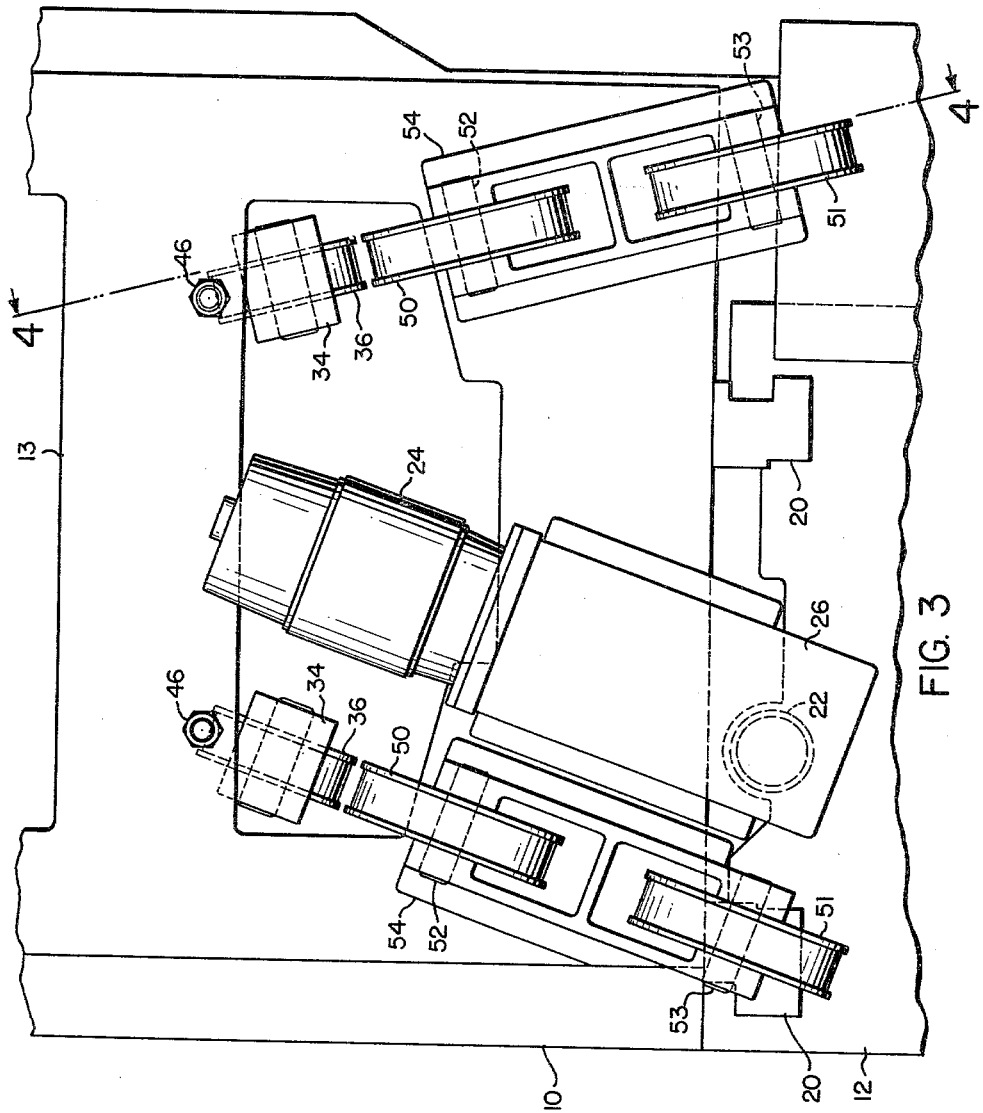
FIG. 3 is a fragmentary top plan view on an enlarged scale further illustrating parts of the counterbalancing mechanism, the chains being removed for the sake of clarity in illustration.

The column 11 is provided with ways 20 on which the tool slide 12 slides. The tool slide is adapted to be moved vertically for adjustment relative to the workpiece, which is mounted on the bed 10, by means of a screw 22 and a nut (not shown) which is secured to the tool slide and which engages with the screw 22. Rotation of the screw 22 may be effected by a motor 24 (FIG. 3) through reduction gearing (not shown) enclosed in the gear box 26.

For leveling the slide 12 and counterbalancing it in its movement, two cylinders 30 (FIGS. 4 and 6) are provided. Each of these cylinders has a piston 31 reciprocable therein that has a piston rod 32 secured to it. The upper end of each piston rod 32 is secured by a screw and nut connection or other suitable connection to a yoke 34 (FIG. 5) in which is rotatably mounted an idler sprocket 36. A chain 38 is arranged to travel around each idler sprocket. One end of each chain is connected by a block 40 and pin 41, links 42, and pin 43 to a screw stud 45 which is adjustably threaded into the column 13 and secured in any adjusted position by the nut 46. Each chain 38 passes around the idler pulley 36 and over two idler pulleys 50 and 51 which are journaled by means of studs 52 and 53 (FIG. 4) in a bracket 54 that is secured on top of the column. Each chain is fastened at its opposite end by means of links 62, pins 63 and 64, and a stud 65 to the slide 12 in a manner similar to the connection of the chain to stud 45.

In the operation of the hydraulic counterweight or counterbalancing mechanism, as the tool slide 12 is moved downwardly from the position shown in full lines in FIG. 4 to that shown in dotted lines, each idler 36, the associated yoke 34, the associated piston rod 32, and the associated piston 31 (FIG. 6) are pulled upwardly against the resistance of the hydraulic fluid flowing out of the upper end of the associated cylinder 30, thus counterweighting or counterbalancing the slide 12. Conversely, as the tool slide is moved upwardly, each idler 36, yoke 34, piston rod 32, and piston 31 descend. To insure full counterbalance of the slide 12 during upward or downward adjustment, and during cutting, when it should be maintained fixed to prevent chatter due to backlash between screw 22 and its nut, means are provided to control the flow of the hydraulic fluid both into and out of the upper end of each cylinder 30. This means is illustrated in FIG. 6.

Figure 6:
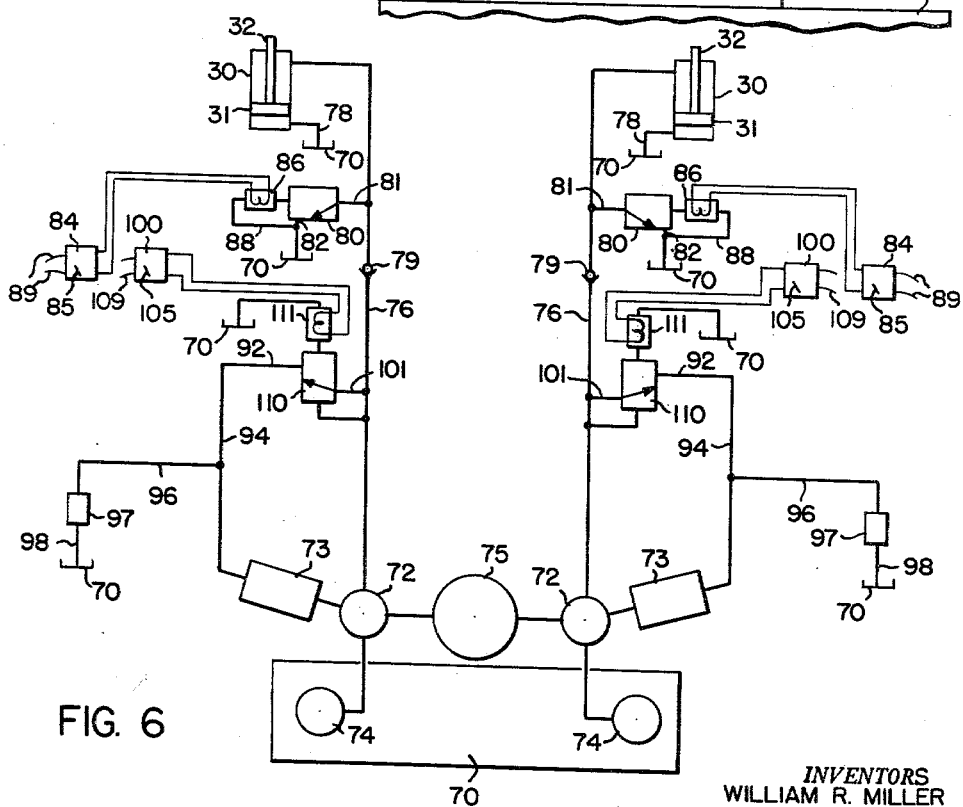
FIG. 6 is a schematic diagram showing the controls for the counterbalancing mechanism.

In FIG. 6, 70 denotes the sump or reservoir. To avoid too many lines, which would obscure the showing of FIG. 6, the sump 70 is shown several times in this figure, but it will be understood that there is intended to be only one sump or reservoir in the machine, and that all the lines illustrated as flowing to the sump 70 flow to this one sump or reservoir. Pumps 72 pump the hydraulic fluid out of this sump or reservoir after passing it through conventional filters 74.

The pumps 72 may be conventional hydraulic swashplate type pumps, such as the current 600, 700, 800 Series Variable Volume Pumps sold by Denison Engineering Division, American Brake Shoe Company, Columbus, Ohio. The angle of inclination of the swash-plates of these pumps may be controlled in conventional manner by conventional piston pumps 73, such as those also sold by Denison Engineering Division, American Brake Shoe Company, Columbus, Ohio. The two pumps 72 are driven simultaneously by an electric motor 75 which is coupled to both.

The two pumps 72 are connected to the upper ends of the cylinders 30 by lines 76. The lower ends of these cylinders are connected to the sump 70 by lines 78. The lines 78 merely serve to carry off any of the hydraulic fluid which may leak past the pistons 31.

Since the hydraulic systems, which are connected to the two cylinders 30 are identical, only one of them need be described here in detail.

Mounted in each line 76 is a check valve 79. This valve is opened by hydraulic pressure when the hydraulic fluid is being supplied to the upper end of the cylinder 30. It is closed, when the hydraulic fluid is being exhausted from the upper end of the cylinder, by the pressure of the exhausting fluid. The check valve is so selected or adjusted that its own tendency to close and to remain closed plus any force on it by fluid flowing out of the upper end of cylinder 30 will be greater than the force of the pump 72 tending to open the check valve, at the maximum pressure produced by the pump.

There are two adjustable relief valves 80 and 110 connected to the duct 76, the former by line 81 and the latter by line 101, and the former being connected above check valve 79 and the latter below check valve 79. The position of relief valve 80, that is, the amount of its opening, is controlled by a solenoid 86 and a potentiometer 84. The position of the potentiometer is set (adjusted) by the hand lever 85. The position of the relief valve 110 is controlled by a solenoid 111 and by a potentiometer 100, whose position is set (adjusted) by the hand lever 105.

The settings or adjustments of the potentiometers 84 and 100 are made in accordance with the weight of the tool slide and the parts carried thereby. The potentiometer 84 is set to adjust the amount of the opening of the relief valve 80 in accordance with the weight of the tool slide and the parts carried thereby, when the slide is moving downwardly, that is, when the hydraulic fluid is exhausting from the upper end of the cylinder 30. The potentiometer 100 is set to adjust the amount of opening of the relief valve 110 in accordance with the weight of the tool slide and the parts carried thereby when the slide is moving upwardly, that is, when the hydraulic fluid is being supplied to the upper end of the cylinder 30. Potentiometers 84 and 100 are connected with the source of electrical power supply by suitable electrical connecting lines as indicated at 89 and 109.

To move the tool slide 12 up or down the motor 24 (FIG. 3) is operated to rotate the screw 22 in the direction to effect the desired upward or downward movement, and to the extent required to move the slide to the desired position on the column 11.

Since the upward movement of the slide 12 is against gravity while the downward movement of the slide 12 is assisted by gravity, it will be obvious that the relief valve 80 will be adjusted by potentiometer 84 to open only under a higher pressure than relief valve 110 so that there will be greater resistance to the movement of piston 31 upwardly in cylinder 30 than to the movement of this piston downwardly in the cylinder.

When the slide 12 is being moved downwardly, the hydraulic fluid flowing out of the upper end of cylinder 30 closes check valve 79, and flows through duct 81 in an amount permitted by the setting of relief valve 80 through line 82 to the sump. During this time, and when the slide 12 has attained its desired position under actuation of screw 22, the hydraulic fluid from pump 72 is diverted by closed check valve 79, and flows through line 101, at a rate determined by the setting of relief valve 110, into line 92, and through lines 92 and 94 into cylinder 73 to move the swash-plate of the pump to zero inclination, that is, to a point where the pump idles, and does not pump any fluid into the system. In this position proper counterbalance will have been achieved. Excess fluid exhausts through line 96, a conventional adjustable needle valve 97, and line 98 to the sump.

When the slide 13 is being moved upwardly, the hydraulic fluid is free to flow into the upper end of the cylinder 30 above the descending piston 31; the check valve 79 is opened by the pressure of the fluid from the pump 72. Since the relief valve 80 is set to open only under higher pressure than relief valve 110, and since the relief valve 80 is ordinarily adjusted so that it will open only during downward movement of slide 12, relief valve 80 will not open or will open only slightly. As the slide 12 ascends, and when the slide 12 has attained its desired position by operation of screw 22, the pressure fluid will also flow from line 76 through line 101 and through relief valve 110 and lines 92 and 94 to piston pump 73 to move the swash plate of the pump back to its zero position, which is attained when an equilibrium is reached, that is, when the slide is exactly balanced by the pressure on the upper end of piston 31 at the positions attained by the slide 12 and the piston 31.

Since the systems for the two cylinders 30 are independently adjustable, it will be obvious that through adjustment of the relief valves 80 and 110 of the two systems, the slide 12 can be adjusted so that it will not cant and bind on the ways 20 of the upright but will be level in all positions of its adjustment on the ways 20.

With the mechanism of the present invention it will further be obvious that various forms of tool heads of differing weights, respectively, can be mounted on a given slide 12, or various forms of slides of differing weights, respectively, can be mounted on the column 11 and that by proper adjustment of the potentiometers 84 and 100 the slide with each tool head, or each one of the slides can be fully and completely counterweighted or counterbalanced. Thus, as indicated in FIG. 2, a tool head 13′ carrying a single milling cutter 18′ on a spindle 14′, and a drive motor 15′ therefor, can be mounted on ways 20 in place of tool head 13, motor 15 and cutters 18, and be counterbalanced by adjustment of the control mechanism of the present invention; and similarly a tool head carrying a drill 18″ (shown in dotted lines) can be counterbalanced.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. The combination with
   (a) a column,
   (b) a slide reciprocable vertically thereon, and
   (c) means for reciprocating said slide, of
   (d) means for counterbalancing the slide comprising
   (e) a cylinder and a piston, one of which is movable relative to the other and one of which is connected to said slide to be moved in opposite directions, respectively, upon movement of said slide in opposite directions,
   (f) a single first duct connected to said cylinder for conducting hydraulic fluid into said cylinder between one end face of said piston and the opposed end face of said cylinder when said slide is moving in one direction and for conducting hydraulic fluid from between said end faces when said slide is moving in the opposite direction,
   (g) means for supplying hydraulic fluid to said first duct when said slide is moving in said one direction including a second duct,
   (h) means for shutting off said first duct from said second duct when said slide is moving in said opposite direction,
   (i) means for exhausting fluid from said first duct when said slide is moving in said opposite direction including a first relief valve, and
   (j) means for exhausting fluid from said second duct including a second relief valve,
   (k) said relief valves being separately adjustable so that greater pressure is required to open said first relief valve than said second relief valve.

2. The combination as claimed in claim 1, wherein the shut-off means comprises a check valve which is disposed to open by the pressure of the fluid in said second duct when said slide is moving in said one direction, thereby to supply fluid to said first duct, and which is disposed to close by pressure of fluid exhausting from between said end faces when said slide is moving in said opposite direction.

3. The combination as claimed in claim 1, wherein said fluid supply means includes a pump, means is provided for controlling the rate of delivery of the fluid by said pump, and the last-named means is operated by pressure of fluid exhausting from said second duct through said second relief valve to close down said pump when counterbalance has been achieved, regardless of the direction in which said slide is moved.

4. The combination as claimed in claim 3, wherein said shut-off means comprises a check valve which is disposed to open by the pressure of the fluid in said second duct when said slide is moving in said one direction, thereby to supply fluid to said first duct, and which is disposed to close by pressure of fluid exhausting from between said end faces when said slide is moving in said opposite direction.

5. The combination with
   (a) a column,
   (b) a slide reciprocable vertically on said column, and
   (c) means for reciprocating said slide, of
   (d) means for counterbalancing the slide comprising
   (e) a pair of cylinders and a pair of pistons, one member of each pair being connected to said slide to be moved in opposite directions, respectively, upon movement of said slide in opposite directions,
   (f) a single first duct for conducting hydraulic fluid into each cylinder between one end face of the associated piston and the opposed end face of that cylinder when said slide is moving in one direction and for conducting hydraulic fluid from between said end faces when said slide is moving in the opposite direction,
   (g) means for supplying hydraulic fluid to each of said first ducts when said slide is moving in said one direction including two second ducts, one of which is associated with each said first duct,
   (h) means for shutting off each said first duct from its associated second duct when said slide is moving in said opposite direction,
   (i) said last-named means for each said first duct being operable by pressure of fluid exhausting from between said opposed end faces of the associated piston and cylinder,
   (j) means for exhausting fluid from each said first duct when said slide is moving in said opposite direction including a first relief valve, and
   (k) means for exhausting fluid from each said second duct including a second relief valve,
   (l) said four relief valves being separately adjustable to control the pressures required to open them.

6. The combination as claimed in claim 5, wherein
   (a) each said shut-off means includes a check valve which is disposed to open by the pressure of fluid in said second duct when said slide is moving in said one direction, thereby to supply fluid to said first duct, and which is disposed to close by pressure of fluid exhausting from between said end faces when said slide is moving in said opposite direction, and
   (b) each said fluid supply means includes a pump, and
   (c) means is provided for controlling the rate of delivery of the fluid by said pump, and
   (d) the last-named means is operated by pressure of fluid exhausting from said second duct through said second relief valve to close down said pump when counterbalance has been achieved.

7. The combination with
   (a) a column,
   (b) a slide reciprocable vertically on said column, and
   (c) means for reciprocating said slide, of
   (d) means counterbalancing said slide comprising
   (e) a cylinder, a piston reciprocable in said cylinder, said piston being connected to said slide to be moved thereby in opposite directions, respectively, upon movement of said slide in opposite directions,
   (f) a single, first duct connected to said cylinder for conducting hydraulic fluid into said cylinder between the upper end face of said piston and the opposed end face of said cylinder when said slide is moving upwardly and for exhausting hydraulic fluid from between said end faces when said slide is moving downwardly, (g) means for supplying hydraulic fluid to said first duct when said slide is moving upwardly including a second duct, (h) a pump for pumping hydraulic fluid into said second duct, (i) a check valve interposed between said ducts, to be closed by pressure of fluid exhausting from between said end faces when said slide is moving downwardly and to be opened by pressure of fluid from said pump when said slide is moving upwardly, thereby to put said ducts into communication, (j) means for exhausting fluid from said first duct including a first relief valve, (k) means for exhausting fluid from said second duct including a second relief valve, (l) said two relief valves being adjustable separately so that said first relief valve requires greater pressure to open than said second relief valve, and (m) means operable by fluid exhausting through said second relief valve for controlling the rate of delivery of fluid by said pump.

References Cited by the Examiner

UNITED STATES PATENTS

| 1,905,673 | 4/33 | Archea | 77—36 X |
| 2,899,869 | 8/59 | Daugherty | 77—36 X |

WILLIAM W. DYER, Jr., *Primary Examiner.*